No. 859,375. PATENTED JULY 9, 1907.
G. C. EHLERS.
DAMPER.
APPLICATION FILED OCT. 12, 1906.

Witnesses
Inventor
George C. Ehlers
By Erwin E. Wheeler
Attorneys

UNITED STATES PATENT OFFICE.

GEORGE C. EHLERS, OF MILWAUKEE, WISCONSIN.

DAMPER.

No. 859,375.  Specification of Letters Patent.  Patented July 9, 1907.

Application filed October 12, 1906. Serial No. 338,538.

*To all whom it may concern:*

Be it known that I, GEORGE C. EHLERS, a citizen of the United States, residing at Milwaukee, county of Milwaukee, and State of Wisconsin, have invented new and useful Improvements in Dampers, of which the following is a specification.

My invention relates to improvements in dampers.

The object of my invention is to provide a simple, inexpensive and durable form of damper adapted to wholly close an air passage or pipe, my improved damper being designed for use in connection with controlling mechanism for hot air furnaces for cutting off the heated air from the pipes adjacent to the furnace, and in which register dampers may be dispensed with only by providing a form of damper adjacent to the furnace which will effectually prevent leakage of hot air into the pipes when such damper is in closed position.

A further object is to provide an improved fastening which can be adjusted in holding position in the basement and released from an upper floor or room in the building.

Figure 1:
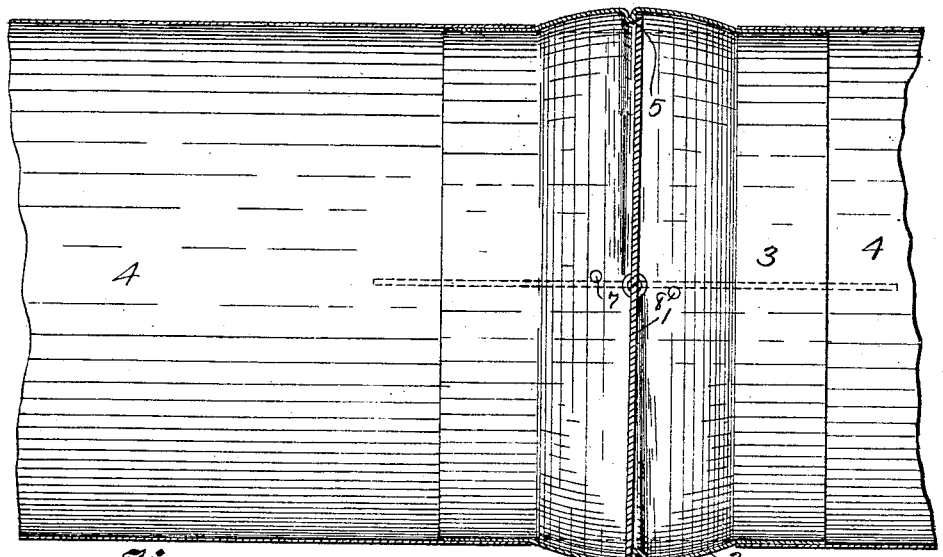
Figures 2, 3:
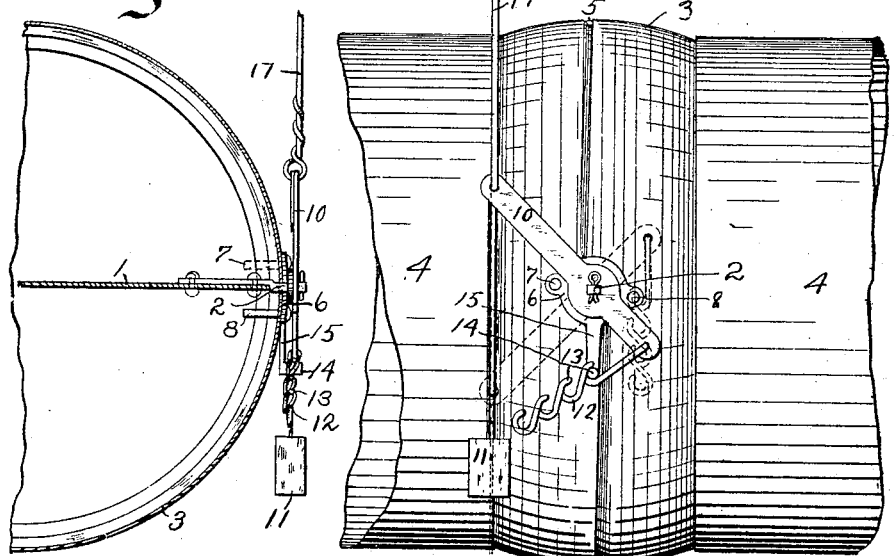
Figure 4:
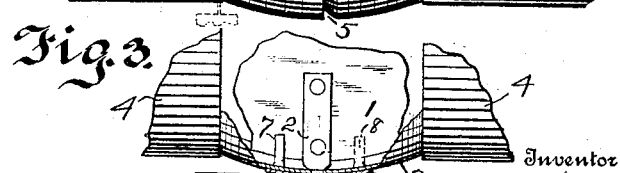

In the following description, reference is had to the accompanying drawings in which, Figure 1 is a longitudinal sectional view of a portion of a hot air pipe showing my improved damper applied thereto, and the damper valve in closed position. Fig. 2 is a cross sectional view of a portion of the pipe with the damper valve in open position, the view being drawn to a plane cutting the pipe near the axis of the damper. Fig. 3 is a side view showing the damper controlling lever fastened with the valve in open position, with dotted lines indicating the position when the valve is closed. Fig. 4 is a detail view of a portion of the pipe, partially broken away to show the damper valve in its open position.

Like parts are identified by the same reference characters throughout the several views.

A circular damper disk or valve 1 is provided with projecting trunnions 2, mounted in a supporting pipe section 3 formed to receive the ends of the ordinary pipe sections 4, and having its central portion spherically enlarged, with a curvature corresponding with that of the disk margin. The enlarged portion of the pipe section is creased segmentally, forming interior abutments 5 for the damper margins. The creases are formed on opposite sides of the plane of the damper disk when in open position, and extend in transverse planes, offset from each other substantially the thickness of the disk which is pivoted between them, so that when the disk is in closed position, one face of the disk, on one side of its axis, will contact with one abutment and the other face of the disk on the other side of the axis will contact with the other abutment, thus forming a tight joint. The abutments, however, are located in the spherical enlargement, wholly outside of the cylindrical space corresponding with the body of the pipe, and the air passage is therefore not obstructed by reason of their presence.

The trunnions are journaled in bearing members comprising plates 6, which are secured to the pipe section 1 by bolts 7 and 8, the latter being extended within the pipe to form stops for the damper disk. The left hand bolt in the construction shown is located at a higher level than that on the right, the former being above and the latter below the disk when in open position, whereby the disk is arrested and held in a horizontally open position.

One of the trunnions is extended and connected with a lever 10 having a weight 11 at one side of the point of trunnion connection and a fastening member 12 provided with a series of hooks 13 at the other side of said point of connection. The member 12 is preferably formed of wire, which is bent or looped to form hooks, each of which opens upwardly and is adapted to engage a catch pin 14 on an arm 15 of the plate 6. When the member 12 is released, it swings downwardly and permits the damper to swing to open position with the lever and member 12 in the positions indicated by dotted lines in Fig. 3. A link rod 17 is attached to the weighted end of the lever. This may extend to an upper portion of the building to permit the operation of the damper from that point. The member 12 is adjusted to fastening position when it is desired to open the damper from the basement. The series of hooks permits an adjustment of one-fourth, one-half, three-fourths, or at nearly the full open position, and the weight at the other end of the lever holds the fastening to the catch pin and thus locks the damper in such position. To adjust the damper by means of the link rod 17, the rod is first drawn upwardly to push the fastening from the catch pin 14, when it swings by gravity to a vertical position and the damper may then be freely adjusted and held by means of the link in any desired position.

Having thus described my invention what I claim as new and desire to secure by Letters Patent is,

1. The combination with a circular damper disk having supporting trunnions, of a supporting pipe section having its central portion spherically enlarged and curved in correspondence with the curvature of the disk margin, and provided with segmental creases forming interior abutments for the damper margins; journal plates secured to the outer surfaces of the pipe section; bolts securing the journal plates in position and arranged to project inwardly and serve as stops for the damper plate; a lever, weighted at one end and secured to one of the trunnions at an intermediate point; and a fastening member secured to the other end of the lever; said journal plate being provided with a projection at one side of the normal position of the locking link; said fastening member having notches opening upwardly and adapted to receive the projection when said member is swung laterally; and an actuating link connected with the weighted end of the lever.

2. The combination with a circular damper disk having supporting trunnions; of a supporting pipe section having its central portion spherically enlarged, with a curvature corresponding substantially to the curvature of the disk margin, and provided with segmental creases forming interior abutments for the damper disk wholly within the enlargement of the pipe section, whereby the air passage is of full capacity throughout the length of said pipe section.

3. The combination with a circular damper disk having supporting trunnions, of a supporting pipe section having its central portion spherically enlarged with a curvature corresponding substantially to the curvature of the disk margin and provided with segmental creases forming interior abutments for the damper disk; said abutments being located within the enlargement and arranged to leave an opening of a capacity equal to that of the pipe beyond said enlargement; bearing members for said supporting trunnions, and bolts connecting said bearing members with the pipe section and projecting inwardly to form stops for the damper disk; one of said bolts being in a position to engage the upper and the other the lower face of the disk on opposite sides of the axis when the disk is in open position.

4. In a damper of the described class, the combination with the pivoted disk, of an exterior lever having weight at one end; an upwardly extending link secured to the weighted end of the lever; a fastening pivotally secured to the other end of the lever and provided with a series of hooks; and a catch pin at one side of the normal position of said fastening; said fastening being arranged to be held in engagement with the catch pin by said weight.

In testimony whereof I affix my signature in the presence of two witnesses.

GEORGE C. EHLERS.

Witnesses:
LEVERETT C. WHEELER,
M. M. SCHULZ.